Oct. 4, 1932.  H. H. GARNER ET AL  1,881,049
AIR CLEANER
Filed Aug. 5, 1929   2 Sheets-Sheet 1
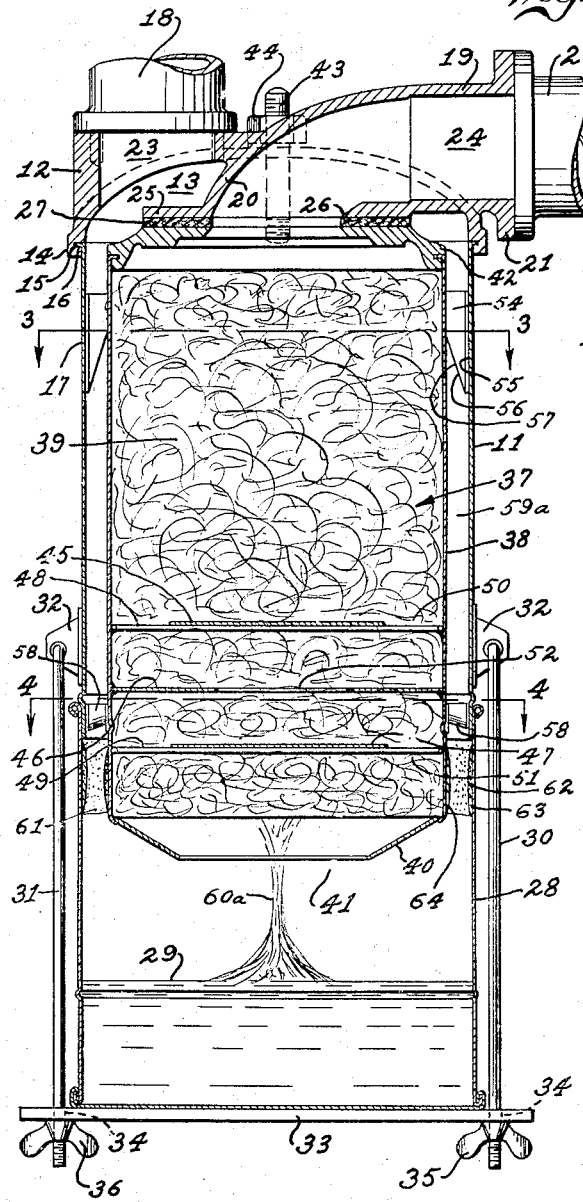
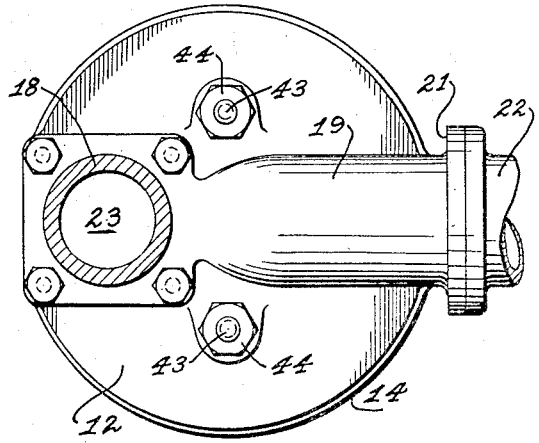
INVENTORS:
Herman H. Garner,
Fred R. Nohavec,
George Harold Hopkins,
By
Attorney

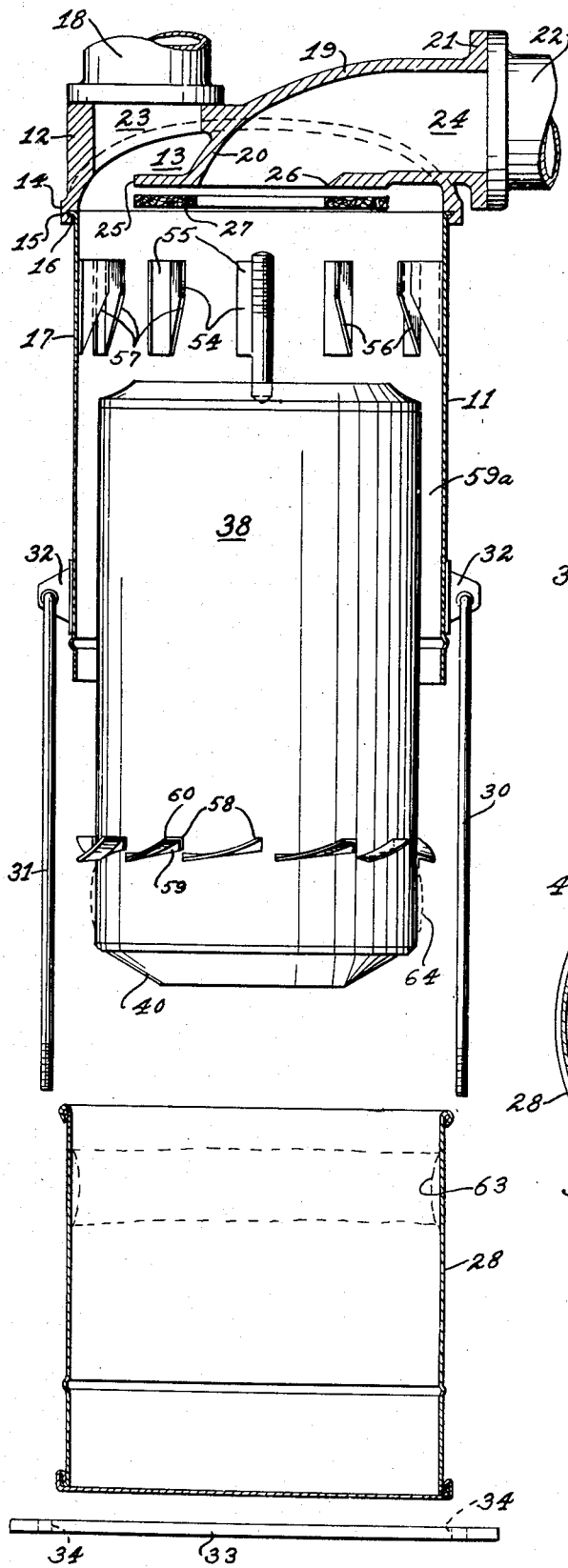

Patented Oct. 4, 1932

1,881,049

UNITED STATES PATENT OFFICE

HERMAN H. GARNER AND FRED R. NOHAVEC, OF CLAREMONT, AND GEORGE HAROLD HOPKINS, OF PASADENA, CALIFORNIA, ASSIGNORS TO VORTOX MANUFACTURING COMPANY, OF CLAREMONT, CALIFORNIA, A CORPORATION OF CALIFORNIA

AIR CLEANER

Application filed August 5, 1929. Serial No. 383,630.

The present invention relates to air cleaners which are applied to the intakes of internal combustion engines for the purpose of removing dust and dirt from the air before it enters the engines.

The invention is particularly applicable to tractors or to automobiles which operate under extremely dusty conditions.

The principal object of the invention is to provide an air cleaner which will remove from the air before it passes to the internal combustion engine practically any dust or dirt which may be carried therein.

In the wet type of air cleaner, to which the present invention pertains, there is somewherein the inlet a boundary zone between the wet and the dry part of the cleaner. On one side of this zone, the inlet walls are perfectly dry and the dust does not adhere to them. On the other side of the zone the walls are washed clean by the liquid, but in the zone itself there is a range between very wet and slightly damp surface. Under these conditions, the dust tends to gather in this zone, gradually building up a ridge of moist dirt which interferes with the action of the air cleaner.

Usually the inlet is rather inaccessible and is not located where this accumulation of dirt will ever be seen by the operator and therefore is not cleaned out, the accumulation of dirt gradually becoming larger and larger the longer the air cleaner is in use.

It is a further object of the invention to provide an air cleaner of the character described wherein the moist zone is so situated that it is entirely exposed when the liquid material cup is detached from the cleaner proper to empty out the dirt accumulation and to refill the cup with liquid, part of the zone being on the inside of the cup adjacent the top, and the other part being on the outside of the bottom end of the filter material holder.

In air cleaners at present used, there is a tendency for the major portion of the air to flow directly through the center of the filter, leaving the outer portions ineffective to perform their full filtering duty.

Another object of the invention is to provide an air cleaner having means for distributing the air through a tortuous path and therefore throughout the entire filter material.

A further object of the invention is to provide an air cleaner with centralizing means for the filter receptacle, the said centralizing means also causing the air passing through the outlet channel to centrifugate in order that a centrifugal separation of the dust particles from the air will be accomplished.

A still further object of the invention is to provide an air cleaner of the character described having air inlet and outlet means located at one end of the cleaner casing, the air inlet means comprising a circumferential inlet which eliminates any connection on the side of the filter.

Another object of the invention is to provide an air cleaner having a filter element detachably connected thereto and including novel means for supporting the filter element in operative position.

The invention is capable of receiving a variety of mechanical expressions, one of which is shown in the accompanying drawings, but it is to be expressly understood that the drawings are for the purpose of illustration only and are not to be construed as a definition of the limits of the invention, reference being had to the appended claims for that purpose.

In said drawings:

Fig. 1 is a vertical section of an air cleaner embodying our invention.

Fig. 2 is a top plan view of the same and illustrating the closure casting containing the air inlet and outlet passages.

Fig. 3 is a section on a plane indicated by the line 3—3 of Fig. 1.

Fig. 4 is a section on a plane indicated by the line 4—4 of Fig. 1.

Fig. 5 is an extended view of the cleaner in which parts of the same are dismantled and in section.

In the embodiment of the invention illustrated in these drawings, 11 is a cylindrical casing which is provided with a closure block 12 in the form of a metal casting having a circular depression 13 and a circular flange 14 surrounding the depression and increasing the depth thereof below the top of the closure block. The circular flange 14 is formed with an interiorly disposed annular groove 15 adapted for the reception of a bent over annular portion 16 formed on the upper end of a wall 17 of the casing 11, and the metal constituting the casting at this point is preferably brazed to effectively secure the closure block 12 firmly upon the casing. The closure block 12 is provided with a hollow vertical extension or pipe 18 which leads from the atmosphere and a hollow lateral extension 19 integrally formed therewith. The extension 19 has a portion 20 projecting within the block depression 13 and a portion 21 which projects outwardly from the top part of the closure block, the portion 21 being adapted for connection to a pipe 22 leading to the intake of a carburetor of an internal combustion engine, not illustrated. The extensions 18 and 19, by virtue of their hollow construction, provide an air inlet passage 23 and an air outlet passage 24, respectively. In this connection, it may be stated that the lower end of the air outlet passage 24 is disposed centrally of the closure block depression 13 while the inlet passage 23 is disposed at the extreme left hand side of the closure block 12 and opens into the upper curved wall defining the depression 13.

The closure block extension portion 20 is formed on its lower end with a horizontally disposed flange 25 which surrounds the lower opening 26 of the passage 24 and provides a seat for the reception of a gasket 27, the purpose of which will be hereinafter more fully described.

Adapted to telescope on the lower end of the casing 11 is an oil cup 28 which is adapted to contain oil approximately at a level 29. The oil cup 28 is secured in place by retaining means in the form of rods 30 and 31 which are pivotally mounted in oppositely disposed lugs 32 secured in any desirable manner on the lower exterior surface of the casing 11. The cup 28 is supported upon a bar 33 which is apertured at 34 for the reception of the lower ends of the rods 30 and 31, which latter are threaded at this point and carry wing nuts 35 and 36. The wing nuts 35 and 36, when adjusted in one direction upon the threaded ends of the rods 30 and 31, force the bar 33 upwardly against the base of the cup 28, and an effective seal is thus formed between the casing 11 and said oil cup 28.

Supported within the casing 11 in a manner to be hereinafter described is a filter unit 37 which consists of a cylindrical shell 38 containing a filtering material 39. This filtering material is preferably a mass of interentangled crimped wire. To the lower end of the shell 38 is secured a frusto-conical baffle plate 40. This baffle has a circular opening 41 through which air to be cleaned passes to the filter material 39.

The upper end of the shell 38 has a head casting 42 from which studs 43 extend. This head casting 42 is adapted to fit snugly against the horizontally disposed flange 25 of the closure block 12, the gasket 27 being interposed therebetween for insuring a seal at this point. The studs 43 extend through suitable openings provided in the closure block 12, and nuts 44 are screwed on the threaded ends of said studs, thus removably securing the shell 38 of the filter unit 37 to the closure block 12. The filter unit 37 is provided with a series of superimposed baffles 45, 46 and 47. The baffles 45 and 47 are in the form of perforated metal disks which are supported in spaced relationship on wire frames 48 and 49. The ends of the wire frames 48 and 49 are secured in any appropriate manner to the inner wall of the shell 38, as clearly illustrated in Fig. 4. The baffle disks 45 and 47, being disposed centrally of the shell 38, provide annular passages 50 and 51 therearound, while the central baffle disk 46 has a central opening 52. The peripheral edge of the disk 46 is connected in any suitable manner to the wall of the shell 38.

The filter material 39 is packed tightly in the shell 38 and in the spaces between the deflector plates 45, 46 and 47.

The upper end of the filter unit shell 38 is guided in place by a plurality of guide plates 54 of angle shape in cross-section, one leg portion 55 of each of said guide plates 54 being welded to the wall of the casing 11, while the other leg 56 of each of said plates extends outwardly in vertical plane and is adapted to engage the wall at the upper part of the shell when the latter is inserted into the casing 11. The lower ends of the leg portions 56 of the guide plates 54 are cut in an angular plane as at 57 to provide means for guiding the shell 38 to a centralized position within the casing 11, as illustrated in Figs. 1 and 3. The vertical legs 56 also perform the function of directing the air from the inlet 23 into the annular passage around the cartridge 38 in an axial direction.

The lower part of the shell 38 is centralized by means of a plurality of curved vanes or deflectors 58 arranged peripherally around the peripheral surface of the shell in spaced relation, the vertical portions 59 being secured by welding to the shell 38. Portions 60 of the vanes or deflectors are curved inwardly and upwardly, and the outer edges of the portions 60 of said vanes correspond in curvature to the curved wall of the casing 11 with which they make snug contact. It will be noted that the vanes or deflectors 58 are attached somewhat above the lower end of the shell 38 and not only centralize the lower end of the shell 38 but also function to cause the air to whirl in the space or cyclone chamber between the liquid and the filter, throwing the dust particles out against the wet walls of the cup and causing the oil to break up into a spray.

Before starting the engine, oil is put into the cup 28 to the desired level 29, and the cup is then replaced. Whenever the engine is started, it creates a vacuum inside the casing 11, this vacuum drawing air in violently through the inlet 23. The incoming air at atmospheric pressure carrying dust particles impinges against the vanes or deflectors 54 and 58 in the space 59a between the casing 11 and the shell 38. This air is caused by its direction of entrance to centrifugate, causing a vortex 60a between the liquid in the cup 28 and the lower part of the filter shell 38. Due to the centrifugal action above mentioned, the air expands upon entering the casing, and in addition to the centrifugal motion imparted, the air current is deflected or broken up by the vanes or deflectors 58 and travels in a tortuous path, so that the dust particles remaining in the air will be thrown outwardly and not be sucked up through the center of the filtering medium 39 as would be the case if the vanes or deflectors 58 were not provided.

When the cup 28 is locked to the casing 11, as illustrated in Fig. 1, the lower end of the receptacle 38 projects within the cup, and an annular space 61 is formed, which forms a continuation of the upper space 59a.

In all types of wet air filters, there is somewhere in the inlet, as defined by the spaces 59a and 61, a boundary zone 62 between the dry and wet parts of the apparatus.

On one side of this zone the inlet walls are perfectly dry and the dust does not adhere thereto. On the other side of the zone the walls are washed clean by the liquid, but in this zone there is a range between very wet and slightly damp, and under these conditions dust tends to adhere, gradually building up a ridge 63 of moist dirt on the inner top surface of the cup 28 and a ridge of moist dirt 64 on the lower end of the receptacle 38 which interferes with the action of the air cleaner.

In apparatus in common use, the inlets are usually inaccessible and are located where these accumulations will not be seen by the operator and therefore not cleaned out, the accumulations 63 and 64 gradually building up so as to partially close the air inlet opening.

In the present apparatus, the moist zone is so situated that it is entirely exposed when the cup 28 is removed for cleaning or for refilling with oil, part of the dirt accumulation 63 as above described being on the inside of the cup 28 near the top, and the other part 64 being on the outside of the bottom end of the receptacle 38. In this manner when the cup 28 is removed from the casing 11, the dirt accumulation ridges 63 and 64 are entirely visible to the eye, and the operator will be sure to clean off the same.

Another point of advantage in the present invention is that the filter receptacle is easily removed for cleaning, and it is possible to bolt the oil cup 28 and the casing 11 together and make a tight joint. Also a departure is effected by providing an air inlet in the top end of the air cleaner and by passing the air through an internal passage to the cyclone chamber, which dispenses with an inlet projecting down on the outside of the filter receptacle.

In operation, the air is given a rotary motion in the space 61 and in the cyclone chamber above the oil as a result of striking the deflectors or vanes 58, the air being centrifugated in order that a centrifugal separation of the dust particles from the air will be effected.

By providing the baffles 45, 46, and 47 in the receptacle 38, the air is directed from the vortex 60a through a tortuous path so that the air will not all be sucked through the center of the filtering material 39 as it would if the baffles were not provided.

We claim as our invention:

1. An air filter comprising: a casing; a filter unit connected to said casing; a cup connected to said casing and adapted to contain a body of liquid, said filter unit being spaced from the walls of said casing and forming an air passage therebetween; means for circulating air through said casing to draw said body of liquid into said filter; and baffles disposed in the lower end of the space between said casing and said filter unit and extending into said air passage, said baffles being adapted to cause the air to whirl in the space between the liquid and said filter unit, so that the dust particles are thrown outwardly against the wet walls of said cup.

2. An air filter comprising: a casing; a closure for said casing providing an air inlet and an air outlet at the upper end thereof; a filter unit disposed in spaced relation to the wall of said casing; so as to form an annular passage leading downwardly around said filter unit means for supporting said filter unit in said casing; centralizing means for said filter unit; a cup connected to said casing adapted to contain a body of liquid; means at the lower end of said annular passage for producing a vortex in said cup of sufficient strength to draw said liquid into said filter unit; and baffle means in said filter unit for distributing air through said filter unit.

3. An air filter comprising: a casing; a shell disposed in spaced relation with said casing and adapted to contain a filter material; a cup connected to said casing and adapted to contain a body of liquid; means for supporting said shell in said casing; centralizing means for said shell; baffle means disposed between said shell and casing; baffle means in said shell surrounded by said filter material; and means for producing a vortex of sufficient strength to draw said liquid into said filter material, said first mentioned baffle means adapted to cause the air to whirl in the space between the liquid and said filter unit for throwing the dust particles against the wet walls of said cup.

4. An air filter comprising: a casing; a closure for one end of said casing having an air inlet and an air outlet; a shell disposed in spaced relation in said casing adapted to contain a filter material; centralizing means for said shell; a series of air baffles disposed in the space between said casing and said shell; a cup attached to said casing adapted to contain a body of liquid; means for producing a vortex in said cup of sufficient strength to draw said liquid into said filter material; and baffle plates interposed in said filter material adapted to distribute air therethrough.

5. An air filter comprising: a casing; a filter unit supported in spaced relation to said casing; a cup connected to said casing adapted to contain a body of liquid and into which the lower end of said filter unit extends; centralizing means for said filter unit; means for producing a vortex of sufficient strength to draw said liquid into said filter material; and baffle means disposed between said casing and filter unit for causing the air to whirl in the space between said unit and said cup whereby accumulations of wet or damp dust are caused to adhere to adjacent portions of said filter unit and said cup.

6. An air filter comprising: a casing; walls closing the upper end of said casing and providing an air inlet and an air outlet; a cup on the lower end of said casing; an inner wall for enclosing a filter unit in centralized position within said casing and forming within said casing an unobstructed annular passage leading downwardly from said air inlet; means near the lower end of said annular passage for centrifuging the air which passes from said annular passage into the space below said filter unit; and guide members for directing air from said inlet into the upper end of said annular passage in an axially extending direction.

7. An air filter comprising: a casing; walls closing the upper end of said casing and providing an air inlet and an air outlet; a cup on the lower end of said casing; an inner wall for enclosing a filter unit in centralized position within said casing and forming within said casing an unobstructed annular passage leading downwardly from said air inlet; means near the lower end of said annular passage for centrifuging the air which passes from said annular passage into the space below said filter unit; and radial vanes extending between the upper portion of said inner annular wall and the wall of said casing for directing air from said inlet into the upper end of said annular passage in an axially extending direction.

8. An air filter comprising: a casing; a filter unit in said casing, said filter unit having an outer wall which cooperates with said casing to define an inlet passage; means for detachably connecting said filter unit in said casing to permit a removal of said filter unit; a cup detachably connected to the lower end of said casing, and air centrifugating means at the lower end of said inlet passage, the lower end of said filter unit projecting below said casing and said centrifugating means.

9. An air filter comprising: a casing; a filter unit in said casing, said filter unit having an outer wall which cooperates with said casing to define an inlet passage; means for detachably connecting said filter unit in said casing to permit a removal of said filter unit; a cup detachably connected to the lower end of said casing, and air centrifugating means at the lower end of said inlet passage, the lower end of said filter unit and the upper part of said cup overlapping below said centrifugating means to form a mouth for said inlet passage.

In testimony whereof, we have hereunto set our hands at Claremont, California, this 30 day of July, 1929.

HERMAN H. GARNER.
FRED R. NOHAVEC.
GEORGE HAROLD HOPKINS.